June 14, 1938.   A. B. DIETERICH   2,120,641
CORN SHELLER
Filed June 16, 1933   2 Sheets-Sheet 2

WITNESS
Walter Ackerman

INVENTOR
Arthur B. Dieterich
BY Brown, Jackson, Boettcher & Dienner
ATTORNEYS.

Patented June 14, 1938

2,120,641

UNITED STATES PATENT OFFICE 2,120,641

CORN SHELLER

Arthur B. Dieterich, East Moline, Ill., assignor to Deere & Company, Moline, Ill., a corporation of Illinois Application June 16, 1933, Serial No. 676,055

16 Claims. (Cl. 130—6)

The present invention relates to corn shellers and is particularly concerned with the provision of an improved pneumatic cob stacker for disposing of the cobs from which the corn has been shelled.

One of the principal objects of the present invention is the provision of an improved pneumatic cob stacker which consists of a fan adapted to create a blast of air and means for delivering cobs into the blast of air coming from said fan. According to the present invention, the cobs do not go through the fan but are delivered to the air blast ahead of the fan.

Another object of the present invention is the provision of a pneumatic cob stacker which comprises a fan and means for delivering the cobs to the air blast therefrom and which, in addition, includes means for preventing the cobs from dropping back into the fan in the event that the air blast therefrom is temporarily not sufficient to discharge the cobs.

In the cob stackers heretofore provided for disposing of cobs with which I am familiar, the cobs have been fed into the blower itself, and for this reason have not proven satisfactory. Due to the cobs coming into direct contact with the blower parts, the latter are subjected at times to terrific stresses. Ofttimes, also, foreign material, such as rocks, bolts and the like pass along with the cobs, and when such foreign matter is directed into the blower it invariably damages the blower parts. According to the present invention, the cobs are not directed into the blower itself but instead are deposited in the path of the exhaust air ahead of the blower fan, as mentioned above. Thus, the cobs never come into contact with the blower parts.

Still further, another object of the present invention is the provision of improved means for feeding the cobs into the blast of air from the stacker fan. According to the present invention, the cobs from the cob shoe of the sheller are delivered to the air blast by means of a rotary feeder which regulates the volume of cobs going into the blower, such rotary feeder serving as a positive displacement feeding device which prevents overloading. Preferably, the rotary feeder is geared directly to the fan so that one always revolves proportionately to the other.

Still further, another object of the present invention is the provision of a stacker having a rotary cob feeder which functions, not only to feed cobs into the path of air from the blower fan, but also maintains the port through which the cobs are fed closed at all times to prevent the escape of air through the opening through which the cobs are directed. Leakage of air at this point in any substantial quantity would materially detract from the efficiency of the cob blower.

Still further, an additional object of the present invention incidental to the features mentioned above is the provision of means preventing foreign material, such as rocks, bolts and other objects which are too heavy to be carried upwardly with the cobs, from passing rearwardly or backwardly into the blower fan itself. More specifically, it is the purpose of the present invention to provide screen means or the equivalent which serves to keep heavy objects, such as those mentioned above, out of the fan, but which forms no appreciable obstruction for the passage of air therethrough so that the air blast is not disturbed or otherwise interfered with. Preferably, the screen means provided is in the form of a series of longitudinally positioned fins spaced close enough together to prevent such foreign matter from passing therebetween but which forms no appreciable obstruction for the passage of the air blast therebetween.

A further object of the present invention comprises forming the screen means above referred to so as to allow silks, husks and other like material, which are occasionally drawn in to the intake of the blower fan, to escape through the exhaust duct with the air blast. Thus, the screen means which effectively prevents the cobs and other objects from falling backwardly into the fan also serves to permit the escape of silks, husks and the like with the air blast.

Another object of the present invention contemplates the provision of means causing the stacker fan to draw air from out the rear end of the sheller. Usually, corn shellers are provided with a blast fan for creating a draft through the sheller casing or housing so as to separate the dust from the corn dropping through the reciprocating shoe. Generally, this dust laden air blows out the rear end of the sheller and makes operation around the rear end of the machine disagreeable. According to the present invention, the fan of the cob blower is arranged to draw in this dust laden air so that the latter is blown out the end of the cob chute or conduit away from the machine. This is an important feature of the present invention and makes working around the machine much more pleasant.

These and other objects of the present invention will be apparent to those skilled in the art after a consideration of the following detailed construction in which the principles of the present invention have preferably been embodied, taken in conjunction with the accompanying drawings illustrating the preferred construction.

Figure 1:
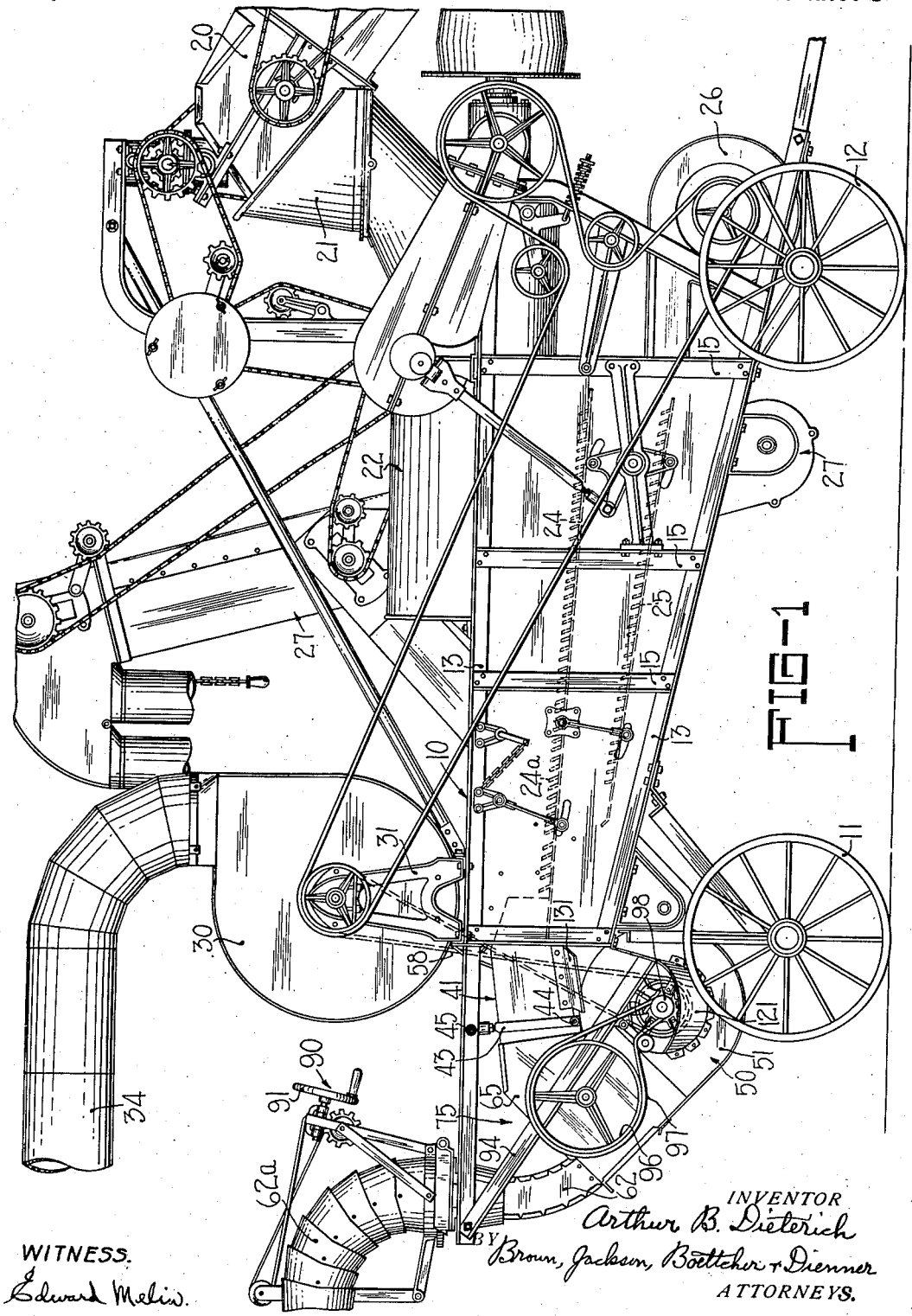
Figure 1 is a side elevation of a sheller embodying the principles of the present invention.

Referring now more particularly to Figure 1, the sheller shown is, in many respects, of the conventional type, and hence it is deemed unnecessary to show in detail all of the operating mechanisms of the sheller. Generally speaking, the sheller consists of a frame 10 supported on front and rear wheels 11 and 12 and consisting of a plurality of longitudinal bars 13 and vertical bars 15. At the rear end of the machine a swinging ear corn feeder 20 is provided and which delivers the corn to a feed hopper 21 from which the corn is directed to a shelling device 22 mounted on the rear of the frame 10 of the sheller. The shelled corn from the shelling device 22 is deposited onto the rear end of a vibrating or reciprocating shoe 24 while the cobs are deposited on the front portion, this portion of the shoe 24 being indicated in Figure 1 by the reference numeral 24a. The cob shoe 24 conveys the cobs forwardly of the machine by the reciprocating movement of the shoe, while the shelled corn drops through the shoe 24 onto a cleaning shoe 25. A blast fan 26 directs a blast of air along the cleaning shoe 25 and underneath the cob shoe 24 to remove dust, dirt and the like from the shelled corn, the latter dropping through the cleaning shoe 25 and finally reaching the grain elevator 27.

The husks, silks and other like materials are removed from the cobs on the cob shoe 24 by means of a suction fan 30 disposed at the front end of the sheller and supported on the sheller frame 10 by suitable brackets 31 or the equivalent. The suction fan 30 includes an intake duct 32, see Figure 2, by which the air is drawn from within the casing or housing of the sheller into the fan 30 and discharged through the outlet conduit 34.

Figure 2:
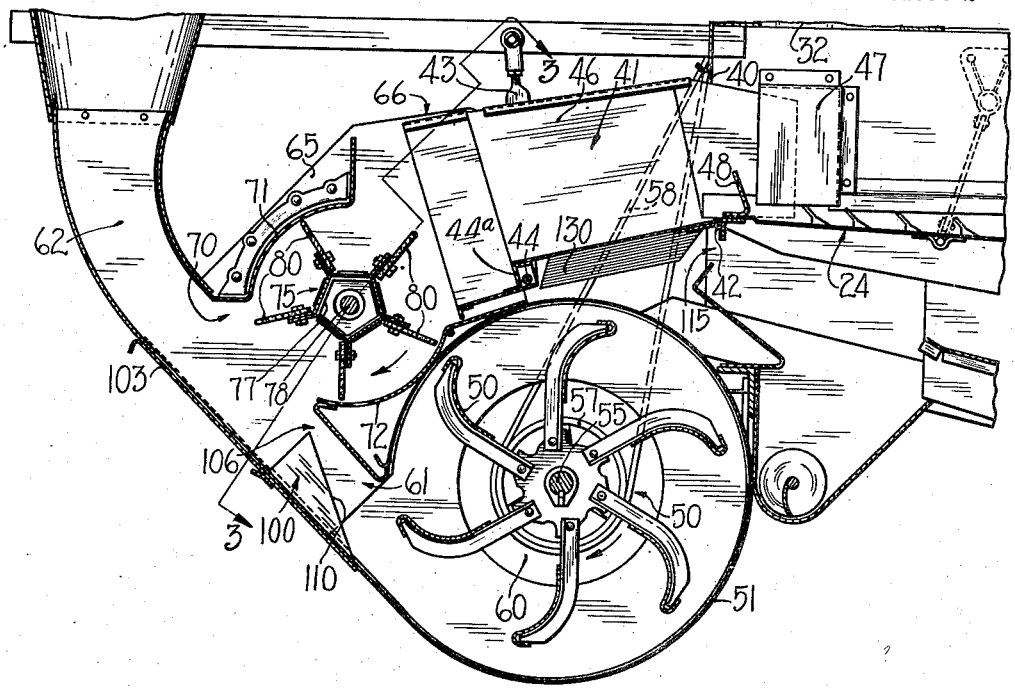
Figure 2 is a longitudinal vertical section taken through the cob blower and associated structure.

The reciprocation of the cob shoe 24 serves to conduct the cobs out of the front end of the sheller, the sheller casing including an opening 40. The cobs are conducted through the opening 40 into a chute 41 which is pivotally connected at 42 to the front end of the shoe 24 and is supported for rocking movement by a pair of links 43 pivotally connected, as at 44, with the front end of the chute 41 and to the frame 10 of the sheller, as at 45. The chute 41 includes two side walls 46 which telescope with plates 47 fixed to the sides of the sheller housing in spaced relation thereto, as best shown in Figure 2, the bottom wall is stepped, as at 44a, for a reason that will appear later. In order to prevent the cobs from passing out of the sheller too quickly, a cob dam 48 is provided at the front end of the cob shoe 24.

The cob blower fan is indicated in its entirety by the reference numeral 50 and includes a casing 51 suitably fixed to and supported by the sheller frame 10 at the front end thereof, as best indicated in Figure 1. A fan shaft 55 is journaled for rotation within the casing 51 and is provided with a series of vanes 56 mounted thereon. A pulley 57 is also mounted on the shaft 55 and receives a belt 58 which drives the fan 50 and which, in turn, is driven from the exhaust fan 30, as indicated in Figure 1.

Air is taken into the fan casing 51 through openings 60, which will be referred to later, and the air blast is delivered through an exhaust port 61 which leads into an exhaust duct 62. The side walls of the exhaust duct or conduit 62 are extended generally upwardly, as indicated at 65, so as to be disposed in telescoping relation with the sides 46 of the chute 41, as indicated at 66 in Figure 2.

The upper side of the exhaust duct 62 is provided with an opening 70, and adjacent this opening the side walls 65 are joined by arcuate walls 71 and 72 to form the casing of a rotary cob feeder, indicated in its entirety by the reference numeral 75 in Figure 2. The rotating feeder 75 comprises a five sided drum 77 mounted on a shaft 78 and to which five radially extending flexible vanes 80 are fixed. The vanes 80 are of sufficient length to substantially close off the space between the curved walls 71 and 72. The closing off of this space by the vanes 80 serves to prevent any of the air blast from passing outwardly of the exhaust duct 62 through the cob feeder 75. It is to be noted that the degree of arc of the curved walls 72 is greater than the angle between adjacent vanes 80. As a result of this construction, the space between the curved walls 71 and 72 is maintained closed at all times.

The cob feeder 75 is arranged adjacent the forward or discharge end of the cob chute 41 so as to receive the cobs therefrom as the same are deposited therein by the reciprocation of the cob shoe 24. As the feeder 75 revolves, it feeds cobs from the chute 41 directly into the stream of exhaust air from the blower 50 in front of the exhaust port 61 thereof. The blast of air through the exhaust port 61 carries the cobs outwardly through the conduit 62 and through the discharge pipe 62a, which may be made adjustable as indicated in Figure 1. To this end, the portion of the conduit 62a is made flexible and may be regulated by control mechanism 90 which includes a hand wheel 91 and a second hand wheel (not shown) controlling the lateral position and the vertical elevation of the discharge pipe. The swivel elbow 62a and the other associated parts, including the adjusting mechanism 90 just referred to, permits delivering the cobs at any angle within a half circle and at a substantial distance from the machine.

It is to be noted that the construction of the cob feeder 75 is such that, not only is leakage of the air blast from the fan 50 through the feeder prevented but also the vaned feeder wheel is such that measured or metered quantities of cobs are positively delivered into the air blast stream at a given rate, dependent upon the rate of rotation of the blast fan itself. The vaned feeder drum or wheel 75 therefore positively acts to prevent overloading of the cob blower, no matter how many cobs are ejected from the cob shoe 24, and the stepped formation 44a of the bottom of the chute 41 insures that each section of the vaned cob feeder 75 will be filled and will deliver the right amount of cobs into the exhaust stream from the cob blower 50. The cob feeder shaft 78 is supported by bearings 92 secured by U-bolts 93 to diagonal frame members 94 connected with the vertical and horizontal bars of frame 10. The shaft 78 carries a pulley 96 fixed to the end thereof and driven by a belt 97 trained over a pulley 98 on the end of the fan shaft 55 opposite the pulley 57 so as to be driven with the blast fan 50 at proportionate speed.

In the preferred construction illustrated in Figure 2, the discharge port 61 for the air blast leads upwardly and forwardly with respect to the sheller, and hence some means is necessary to prevent the cobs from falling into the fan 50. If the cobs should drop back into the fan, the latter might be damaged because of the stresses involved in the direct impact with the cobs or other objects. In order, therefore, to prevent foreign matter from dropping back through the exhaust port 61 into the blower fan housing 51, screen means 100 is provided. Preferably, the screen means 100 comprises a series of fins 101 extending across the exhaust port 61 and spaced close enough together to prevent cobs, foreign matter, and the like from passing down between them. The fins 101 are formed of pieces of sheet metal or other material bent to a U-shape, whereby each piece forms two fins connected by a base portion 102. Also, the bases 102 form means for fixing the fins to the bottom wall of the exhaust duct. For cleaning out the duct to remove any foreign matter which will not blow out with the exhaust air, a sliding door 103 is provided. As best shown in Figure 2, the door 103 is mounted adjacent the cob feeder 75 and just ahead of the screen 100.

Occasionally silks, corn husks and other materials are drawn in through the intake 60 of the fan 50, and if the screen 100 extended entirely across the exhaust port 61 in a vertical direction, the husks, silks and the like would soon bank up against the screen and materially reduce the efficiency of the blast. In order to provide for the escape of silks, husks and the like, the fins 101 terminate within a short distance from the top wall 105 of the exhaust duct 62. This construction provides a narrow unrestricted opening 106 at this point, and to facilitate the discharge of silks, husks and the like, the rear edges of the fins are inclined upwardly from the base, as shown at 110. This construction or configuration of the fins, together with the unrestricted opening 106, provides a means for allowing the escape of silks and husks which may have been taken into the fan 50 through the intake ports 60 thereof. The silks and husks will slide up the inclined portions 110 and out through the opening 106 and be discharged with the cobs coming from the cob feeder 75.

Figure 3:
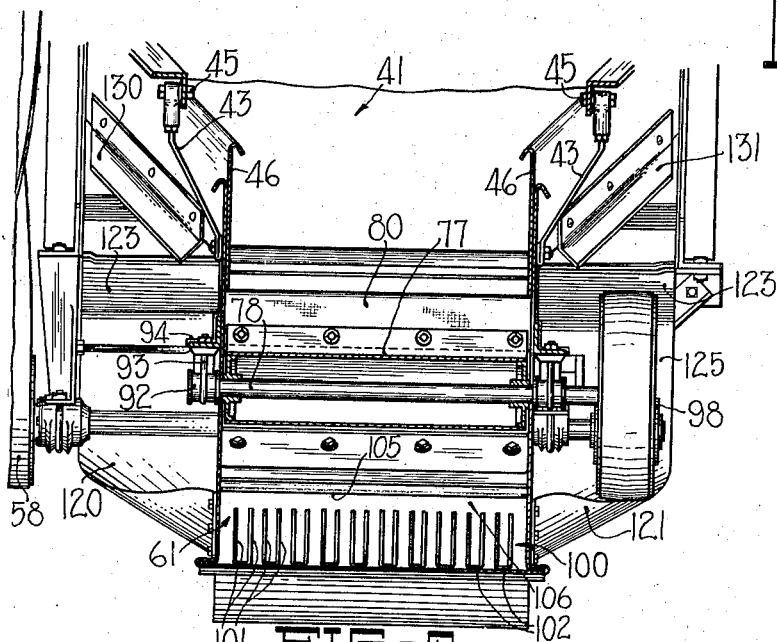
Figure 3 is a section taken along the line 3—3 of Figure 2.

As mentioned above, the blast fan 26 at the rear end of the sheller creates a draft of air along the shoes 24 and 25. Some of this air passes through the shoes and is drawn, together with most of the silks, husks and the like, through the intake port 32 of the exhaust fan 30 at the front end of the sheller. However, a considerable portion of the blast from the fan 26 passes out through the front end of the machine below the cob shoe 24 through an opening 115. This air is laden with dirt and dust, and if allowed to blow out of the front end of the machine, this end of the machine will be quite dusty, making it disagreeable for the operator when regulating the cob pipe 62a by the control mechanism 90. In order that this dust and dirt from the front end of the machine may be conducted away from the machine, a pair of shields 120 and 121 are provided around the intake ports 60 of the blower 50. The shields 120 and 121 are substantially semi-cylindrical in formation and are fixed to the fan housing 51 around the lower half of the intake openings 60. The shields extend outwardly and upwardly and at their rear edges are connected with the sheller frame 10, as indicated in Figure 3 by the reference numeral 123. For this purpose the shields are provided with extensions 125. A pair of deflecting shields 130 and 131 are also provided, these shields being fixed to the sides of the chute 41. The shields 120, 121, 130 and 131 cause the blower fan 50 to include in its intake substantially all of the dust laden air coming from the end of the machine to the opening 115 therein.

The operation of the machine described is believed to be apparent and is substantially as follows.

Corn is delivered to the shelling mechanism 22 through the feeder 20, as somewhat more clearly disclosed in the copending application of Leonard B. Neighbour, Serial No. 674,603, filed June 7, 1933. The operating mechanism for the feeder and shelling mechanism is also operative to reciprocate the shoes 24 and 25 and to also drive the blast fan 26 which cleans the grain and the exhaust fan 30 which draws out the silks, husks and the like. The reciprocation of the cob shoe 24 serves to eject the cobs into the chute 41 by which the cobs are delivered to the lower vanes of the revolving cob feeder 75. This feeder thus serves to deliver predetermined and controlled amounts of cobs into the path of the air blast from the cob blower 50, the rotation of the cob feeder 75 also serving the useful purpose of creating a backward draft in the direction of the arrow in Figure 2, for the rotation of the upper vanes 80, which are not filled with cobs as are the lower vanes, carries air from the exhaust duct 62 toward the chute 41, it being this air which tends to blow back any husks which might otherwise be carried over into the chute 41 with the cobs. The draft from the cob feeder 75 keeps the husks and the like from coming out the opening 40 and directs them into the path of the air currents produced by the suction fan 30. The cob blower 50 draws in air through intakes 60 at opposite sides of the casing 51, and the shields 120 and 121 carried by the casing 51 and the shields 130 and 131 carried by the chute 41 serve to cause the incoming currents of air to include the air blowing out of the sheller through the opening 115 at the front end of the machine.

While I have described above the preferred construction in which the principles of the present invention have been embodied, it is to be understood that my invention is not to be limited to the specific details shown and described above, but that, in fact, widely different means may be employed in the practice of the broader aspects of my invention.

What I claim, therefore, and desire to secure by Letters Patent is:

1. A cob stacker comprising a blower having cob receiving means and air intake ports at both sides of the blower, conveying means including a reciprocatory shoe adapted to receive cobs, husks and the like, means for creating a blast of air around said shoe to prevent husks and the like from being delivered to the stacker, a chute extending from the end of said shoe to receive cobs therefrom and conduct them towards said blower, and means including a shield extending laterally from each side of said chute, and a shield around the lower portion of each of said intake ports and extending upwardly to cause said cob blower to draw in the dust laden air coming from the vicinity of said shoe.

2. A cob stacking mechanism comprising a cob blower having air intake ports at the sides and an exhaust port, cob conveying means including a reciprocatory shoe operating to deliver cobs toward said blower, a chute having a closed bottom extending from the end of said shoe to receive the cobs therefrom, a rotating cob feeder for receiving the cobs from said chute and for conducting them into said exhaust port, said feeder having flexible vanes rotatable about a generally transverse axis, the lower vanes serving to feed cobs into said exhaust port and the upper vanes causing a draft over the top of said chute to blow husks coming over with the cobs back toward said reciprocatory shoe, and means including a shield extending laterally from each side of said chute and a shield around the lower portion of each of said intake ports to cause said cob blower to draw in the dust laden air coming from the vicinity of said shoe.

3. A cob stacker comprising a casing, a fan disposed in said casing, means serving as an exhaust duct leading from said casing, there being an opening in said exhaust duct, a cob feeder disposed adjacent said opening and carried by said duct for delivering material into the path of the air blast from said fan, reciprocatory cob conveying means for conveying cobs toward said feeder, a cob dam carried adjacent the discharge end of said conveying means, and means connected to be operated by said reciprocatory conveying means and including a stepped positively acting cob feeding member for delivering cobs from said conveying means to said feeder.

4. A cob stacker comprising a blower having cob receiving means and an air intake port, cob conveying means including a reciprocatory cob shoe, a chute extending from the end of said shoe to receive cobs therefrom and to conduct them to said blower, and means serving as a shield disposed adjacent the discharge end of said cob shoe on the exterior of said stacker for directing the dust laden air in the vicinity of said end of the shoe to the air intake of said cob blower.

5. A cob stacker comprising a blower having cob receiving means and air intake ports at both sides of the blower, conveying means including a reciprocatory shoe adapted to receive cobs, husks and the like, means for creating a blast of air around said shoe to prevent husks and the like from being delivered to the cob receiving means with the cobs, and shield means extending laterally outwardly with respect to said intake ports and disposed at the end of said reciprocatory shoe so as to draw in the dust laden air coming from the discharge end of said shoe.

6. A cob stacker comprising a blower having cob receiving means and air intake ports at both sides of the blower, conveying means including a reciprocatory shoe adapted to receive cobs, husks and the like, said blower being located below and outwardly of the discharge end of said reciprocatory shoe so as to draw in air from outside the stacker, and a shield arranged around the lower portion of each of said intake ports below and outwardly of the discharge end of said reciprocatory shoe and extending upwardly so that a portion of the air drawn in by said blower includes dust laden air coming from the discharge end of said shoe.

7. A cob stacker comprising a centrally disposed blower having cob receiving means and laterally spaced intake ports at both sides of the blower laterally outwardly of said cob receiving means, conveying means including a reciprocatory shoe adapted to receive cobs, husks and the like, means separate from said blower for creating a blast of air around the discharge end of said shoe and directed inwardly with respect thereto so as to prevent husks and the like from being delivered to the cob receiving means with the cobs, and means including a shield extending laterally outwardly from each side of and around the lower portion of each of said intake ports and extending upwardly with respect thereto toward the discharge end of said reciprocatory shoe so as to cause said cob blower to draw in dust laden air from the discharge end of said shoe.

8. In a stacker, the combination of a cob blower comprising a fan having an intake port and a generally upwardly disposed exhaust conduit, said conduit having an opening at one side thereof, a cob feeder including an arcuate housing discharging into said opening and a member having vanes with flexible sections closely fitting said arcuate housing so as to prevent any substantial loss of pressure from said exhaust conduit, said vaned member being rotatable about a generally horizontal axis disposed transversely with respect to said conduit, generally horizontally disposed means for conveying cobs to the lower vanes of said rotary feeder, said feeder being rotated to cause the lower vanes to advance cobs into said conduit, and a suction fan for separating husks and the like and having an intake disposed adjacent said cob conveying means and serving to prevent husks and the like coming over with the cobs from entering the rotary cob feeder.

9. A cob stacker comprising a blower having cob receiving means and air intake ports at both sides of the blower, conveying means including a reciprocatory shoe adapted to receive cobs, husks and the like, means for creating a backward blast of air around said shoe to prevent husks and the like from being delivered to the stacker, means for conducting the cobs from said shoe to said blower, and means for causing said cob blower to draw in the dust laden air coming from the vicinity of said shoe.

10. Cob stacking mechanism comprising cob receiving means including a reciprocatory cob shoe, a cob blower, a cob feeding device of the positive displacement type for directing a definite quantity of cobs into the discharge blast of said blower, and a movably mounted chute having a stepped bottom providing a substantially vertical shoulder facing toward said device for positively forcing cobs into the latter to fill the same.

11. A cob stacker comprising, in combination, a blower having an exhaust duct extending diagonally upwardly therefrom, said duct having an opening in the upper wall thereof, cob feeding means disposed in said opening, and screening means comprising a plurality of spaced apart vanes mounted on the lower wall of said duct between said opening and said blower, said vanes projecting part way across said duct leaving an opening between the vanes and the upper wall of said duct to permit the escape of husks and the like that are drawn into the blower, the edges of the vanes nearest the blower sloping gradually from the upper ends of the vanes to the lower wall of the duct for guiding said husks and the like over the ends of the vanes, another set of edges cooperating with the lower wall of the duct to form a trough for collecting pieces of material that tend to fall backwardly into said blower.

12. A cob stacker comprising a casing, a fan disposed in said casing, means serving as an exhaust duct leading from said casing, there being an opening in said exhaust duct, a rotary cob feeder disposed adjacent said opening and carried by said duct for delivering material into the path of the air blast from said fan, reciprocatory cob conveying means for conveying cobs toward said feeder, and means connected to be operated by said reciprocatory conveying means toward and away from said rotary cob feeder and including a stepped positively acting cob feeding member for delivering cobs from said conveying means to said feeder.

13. Cob stacking mechanism comprising a cob blower, a vaned cob feeding device of the positive displacement type for directing a definite quantity of cobs into the discharge blast of said blower, a movably mounted chute having bottom and side walls and serving to direct cobs into the lower vanes of said cob feeding device, said cob feeding device including a housing with which the bottom and side walls of said cob chute telescope, and a suction fan for separating husks and the like and having an intake disposed adjacent said chute, said housing being open at the upper portion of said cob feeding device, whereby a draft of air can pass backwardly over the incoming cobs in said chute toward the intake of said suction fan.

14. Cob stacking mechanism comprising a cob blower, a cob feeding device of the positive displacement type for directing a definite quantity of cobs into the discharge blast of said blower, and a movably mounted chute having a stepped bottom providing a substantially vertical shoulder facing toward said device for positively forcing cobs into the latter to fill the same.

15. Cob stacking mechanism comprising cob receiving means including a reciprocatory cob shoe, a cob blower, a cob feeding device of the positive displacement type for directing a definite quantity of cobs into the discharge blast of said blower, a movably mounted chute having a stepped bottom providing a substantially vertical shoulder facing toward said device for positively forcing cobs into the latter to fill the same, link means supporting the end of said chute adjacent said cob feeding device, and means supporting the other end of said chute on said reciprocatory cob shoe.

16. A cob stacker for a corn sheller having a suction fan and an intake therefor, said stacker comprising a casing, a fan disposed in said casing, means serving as an exhaust duct leading from said casing, there being an opening in said exhaust duct, a cob feeder disposed adjacent said opening and carried by said duct for delivering cobs into the path of the air blast from said fan, reciprocatory cob conveying means for conveying cobs toward said feeder, and means adjacent the intake of said suction fan for delivering cobs from said conveying means to said cob feeder.

ARTHUR B. DIETERICH.